(12) United States Patent
Bedro et al.

(10) Patent No.: US 6,220,660 B1
(45) Date of Patent: Apr. 24, 2001

(54) VEHICLE ACTIVITY CENTER

(75) Inventors: Ronald Bedro, Livonia; Jeffrey Arnoldy, Allen Park; David Ekern, Plymouth; John James Flannery, Fenton; Vernon A. Stubbe, Plymouth; Mark Caye, Allen Park; Mark Symonik, Ypsilanti, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/168,643

(22) Filed: Oct. 8, 1998

Related U.S. Application Data

(60) Provisional application No. 60/070,327, filed on Jan. 2, 1998, provisional application No. 60/085,177, filed on May 12, 1998, and provisional application No. 60/093,814, filed on Jul. 23, 1998.

(51) Int. Cl.$^7$ ....................................... A47C 7/62
(52) U.S. Cl. .................. 297/188.04; 297/113; 297/146; 297/411.32; 108/44
(58) Field of Search ............................. 297/14, 112, 113, 297/117, 146, 147, 188.04, 188.05, 188.07, 188.21, 411.29, 411.31, 411.32, 411.37, 411.4; 295/65.16, 37.15; 108/44

(56) References Cited

U.S. PATENT DOCUMENTS

| | | |
|---|---|---|
| 446,632 | 2/1891 | Easte . |
| 1,325,630 | 12/1919 | Fair . |
| 1,802,620 * | 4/1931 | Scully ................................... 297/113 |
| 2,015,315 | 9/1935 | McMackin . |
| 2,025,393 | 12/1935 | Kupfer . |
| 2,132,279 | 10/1938 | Wicknick et al. . |
| 2,136,407 | 11/1938 | Armour . |
| 2,294,039 | 8/1942 | Looney . |
| 2,383,125 | 8/1945 | Hill . |
| 2,619,395 | 11/1952 | Kent . |
| 2,833,334 * | 5/1958 | Hunt ...................................... 297/146 |
| 2,841,212 * | 7/1958 | DeVos ................................... 297/113 |
| 2,866,496 * | 12/1958 | Glass ..................................... 297/146 |
| 3,104,131 | 9/1963 | Krone . |
| 3,131,968 | 5/1964 | Alt . |
| 3,449,011 | 6/1969 | Edwards et al. . |

(List continued on next page.)

FOREIGN PATENT DOCUMENTS

| | | |
|---|---|---|
| 3942629A1 | 6/1991 | (DE) . |
| 4343242 | 6/1995 | (DE) . |
| 19637029C1 | 9/1996 | (DE) . |
| 19506855 | 12/1996 | (DE) . |
| 530819A1 | 9/1992 | (EP) . |
| 0949116A1 | 4/1999 | (EP) . |
| 2380161 | 2/1978 | (FR) . |
| 2391680 | 12/1978 | (FR) . |
| 2753940 | 9/1996 | (FR) . |
| 83/03392 | 10/1983 | (WO) . |
| 90/08671 | 9/1990 | (WO) . |
| 95/00360 | 1/1995 | (WO) . |
| 99/35003 | 7/1999 | (WO) . |

*Primary Examiner*—Laurie K. Cranmer
(74) *Attorney, Agent, or Firm*—Foley & Lardner

(57) ABSTRACT

An activity center for a motor vehicle in which a platform is provided in the vehicle interior, preferably mounted to a seat back. The platform is movable from a stowed position to a horizontal use position overlying a seat cushion and seat back at a seating position for use as a work surface or a play surface. In addition, the activity center includes a storage compartment for toys and other items and may include cup holders, pencil holders, etc. Furthermore, toys such as a stud panel for use with building blocks and drawing toys, such as Etch-a-Sketch®, can be integrated into the activity center.

34 Claims, 5 Drawing Sheets

U.S. PATENT DOCUMENTS

| | | |
|---|---|---|
| 3,467,425 | 9/1969 | Ferrera . |
| 3,615,118 | 10/1971 | Buxton . |
| 3,795,422 | 3/1974 | Robinson et al. . |
| 4,178,626 | 12/1979 | Marcus . |
| 4,466,659 | 8/1984 | Carpentier et al. . |
| 4,711,494 | 12/1987 | Duvenkamp . |
| 5,029,942 | 7/1991 | Rink . |
| 5,286,084 * | 2/1994 | Bart .............................. 297/188.04 X |
| 5,292,174 | 3/1994 | Ohnuma . |
| 5,322,344 | 6/1994 | Hoffman et al. . |
| 5,362,131 | 11/1994 | Susko et al. . |
| 5,375,907 | 12/1994 | Rogers et al. . |
| 5,492,257 | 2/1996 | Demick . |
| 5,516,191 | 5/1996 | McKee . |
| 5,524,958 * | 6/1996 | Wieczorek et al. ........... 297/41.32 X |
| 5,524,959 | 6/1996 | Scott . |
| 5,542,589 | 8/1996 | McKee . |
| 5,556,017 | 9/1996 | Troy . |
| 5,562,331 | 10/1996 | Spykerman et al. . |
| 5,628,439 | 5/1997 | O'Hara . |
| 5,639,002 | 6/1997 | Weitbrecht et al. . |
| 5,681,079 | 10/1997 | Robinson . |
| 5,687,651 | 11/1997 | Hurayt et al. . |
| 5,713,633 | 2/1998 | Lu . |
| 5,787,167 | 7/1998 | Anderson . |
| 5,788,324 * | 8/1998 | Shea et al. ........................... 297/113 |
| 5,816,650 | 10/1998 | Lucas, Jr. . |
| 5,848,820 * | 12/1998 | Hecht et al. ..................... 297/113 X |
| 5,853,220 | 12/1998 | Gulich et al. . |
| 5,863,092 | 1/1999 | Kifer . |
| 5,878,672 * | 3/1999 | Ostermann et al. .................... 108/44 |

* cited by examiner

VEHICLE ACTIVITY CENTER

CROSS REFERENCE TO RELATED APPLICATIONS

This case claims priority from provisional application Ser. No. 60/070,327, filed Jan. 2, 1998, provisional application Ser. No. 60/085,177, filed May 12, 1998 and provisional application Ser. No. 60/093,814, filed Jul. 23, 1998.

BACKGROUND OF THE INVENTION

The present invention relates generally to an activity center for a motor vehicle and in particular to an activity center provided in a vehicle seat assembly which provides a table top surface for a seat occupant that can be used for activities ranging from a child's play to writing or operating a laptop computer.

Many parents have longed for activities within a vehicle to make long distance travel with young children more "peaceful". To that end, parents typically bring numerous books and small toys for the children to play with in the vehicle. The present invention provides an activity center to facilitate play by children in the vehicle. The activity center of the present invention provides a platform or play surface for a seat occupant above his or her lap. In addition, the activity center can include the capability for storing small toys and may include features such as a pencil holder and cup holder.

In addition to storing toys, the activity center may have toys integrated therein. For example, the flat surfaces of the activity center can have portions with raised studs for engagement with interlocking building blocks such as Lego® blocks. Other toys can be integrated into the activity center, especially toys having flat panels such as an Etch-a-Sketch® drawing toy or a Magna Doodle® magnetic drawing toy. The top surfaces of the activity center are preferably formed of a smooth surface suitable for writing and can be formed of a material compatible with dry erase markers, enabling a child to draw directly on the surface of the activity center.

The horizontal top surface of the activity center may also be used as a work surface for writing or supporting a computer.

In a preferred embodiment, the activity center is attached to a pivoting or folding seat back panel such as a center panel in a rear bench seat. The center back panel may rotate forward to a horizontal position to open a pass-thru to the vehicle trunk. In a van or sport utility vehicle, the seat has a back panel which folds forward. With the activity center of the present invention mounted on the rear side of the seat back panel, the activity center can be deployed to provide a play surface for each of the seating positions on either side of the seat back center panel.

The activity center includes a base that is attached to the structure of the seat. A platform mounting member is attached to the base and is movably mounted thereto to move between stowed and use positions. In the stowed position, the platform mounting member engages the base to form a cover for a storage cavity in the base. The platform mounting member is moved to a raised, forward use or open position. From the platform mounting member use position, platforms mounted to the platform mounting member are moved from platform stowed positions to platform use positions in which they partially overlie the seating position on each side of the center panel of the seat back. The platforms have a flat surface which, when the platforms are in their use positions, face upward forming a top surface. Each plafform's top surface is generally horizontal in the use position.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
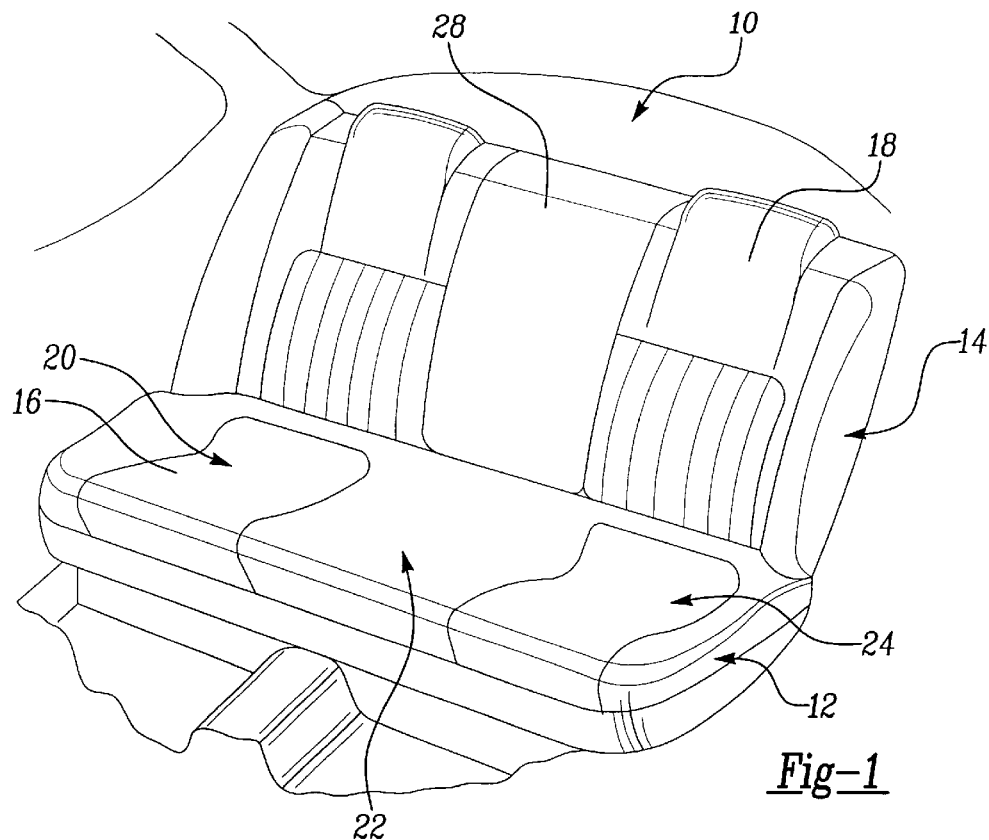
FIG. 1 is a perspective view of a vehicle seat assembly having the activity center of the present invention with the activity center in a stored position.
Figure 2:
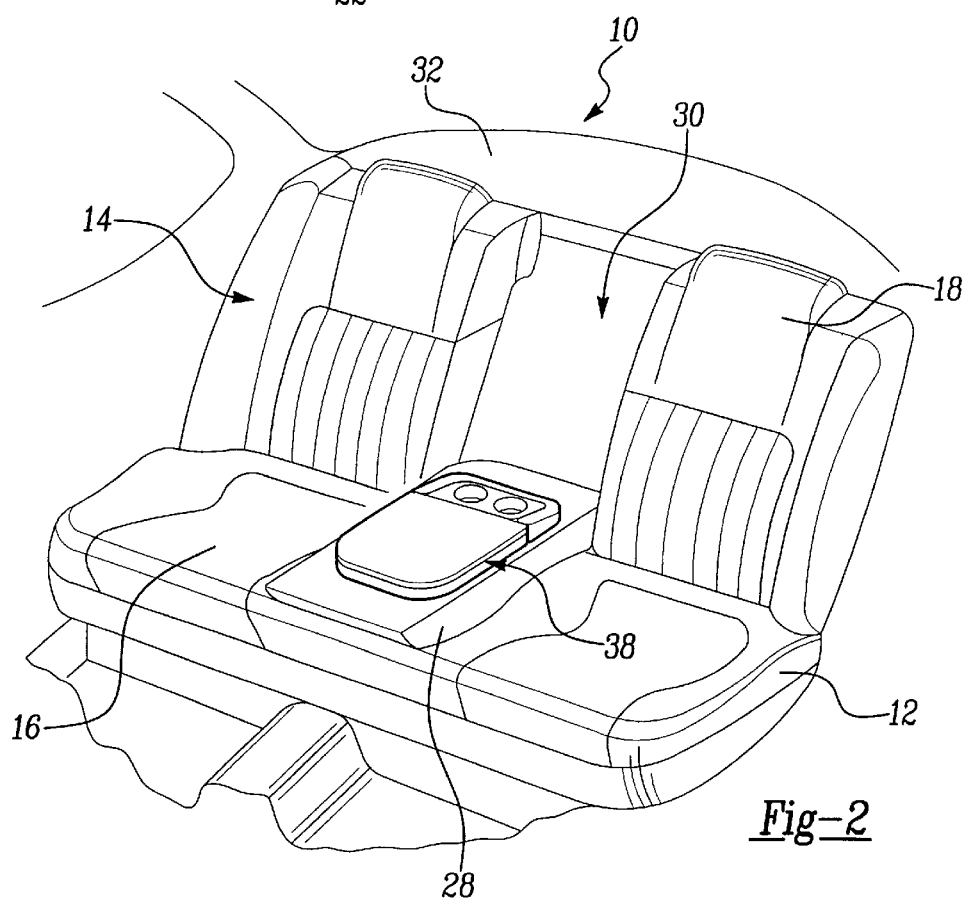
FIG. 2 is a perspective view of the seat assembly shown in FIG. 1 with the center seat back panel folded forward to a position in which the activity center can be deployed.

A seat assembly containing the child activity center of the present invention as shown in FIG. 1 and designated generally at 10. Seat assembly 10 includes a lower, generally horizontal, seat bottom 12 and a seat back 14 extending generally upwardly at the rear of the seat bottom 12. The seat bottom has a top surface 16 which forms a seating surface for occupants of the seat assembly 10. Likewise, the seat back 14 includes a forward surface 18 which forms a seating surface for occupants of the seat assembly. The seat assembly has a pair of outboard seating positions 20 and 24 which are defined by the surfaces 16 and 18 of the seat back and seat bottom respectively. Each of the seating positions has a width dimension measured laterally across the vehicle to provide space on the seat assembly for a pair of seat occupants. Depending on the overall width of the seat assembly, a third seating position 22 may be provided in the center portion of the seat assembly between the two outboard seating positions 20 and 24.

The seat back 14 includes a center panel 28 which can be pivoted or folded from its upright position shown in FIG. 1 to a generally horizontally extending position above or resting on the seat bottom 12. In the horizontal position, a pass-thru opening 30 is revealed leading to a trunk area behind the seat assembly and beneath a package shelf 32 as conventionally found in a passenger car.

Figure 3:
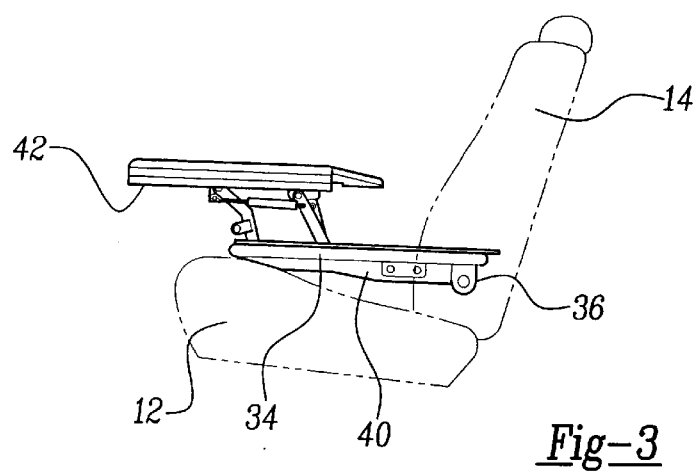
FIG. 3 is a side view of the seat assembly shown in FIG. 2 with the activity center in a deployed position.

The center panel 28 has a structure 34 which includes a mounting boss 36 for pivotal mounting of the panel 28 to the frame (not shown) of the seat back 14. The activity center 38 in this embodiment is mounted to the structure 34 of the center panel 28. The activity center is shown in FIG. 3 in a deployed position.

The activity center 38 includes a base 40 which is fixed to the structure 34 of the seat back center panel 28. A platform mounting member 42 is attached to the base 40. A pair of platforms 44 and 46 are in turn mounted to the platform mounting member 42.

Figure 4:
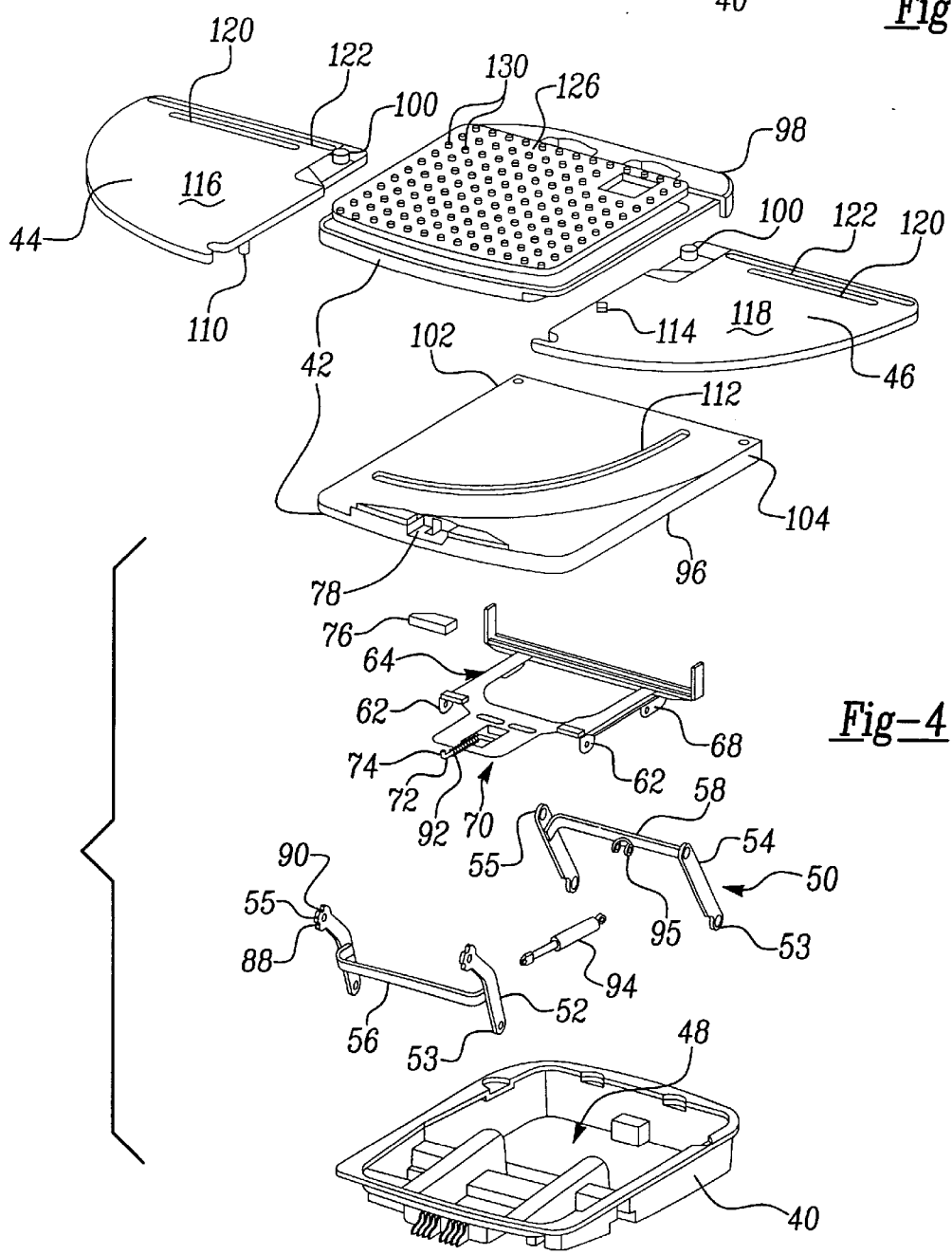
FIG. 4 is an exploded perspective view of the activity center.

The base 40 is generally shaped as a pan which is concave when viewed from above. The interior 48 of the pan forms a storage compartment to hold toys, pencils, crayons, books, markers, etc. The platform mounting member 42 serves as a lid to close the base interior 48 when the platform mounting member 42 is in its stowed position relative to the base. The platform mounting member is movable from a stowed position in which it closes the base interior to a forwardly and upwardly raised use position or open position shown in FIGS. 3–5. In the embodiment shown in FIGS. 3–5, a 4-bar linkage mechanism 50 is used to mount the platform mounting member 42 to the base 40 for movement between its open and closed positions. The 4-bar linkage mechanism 50 includes a pair of front and rear links 52 and 54 on both the left and right hand sides of the base 40. The front links 52 are coupled to one another by a front cross bar 56 while the rear links 54 are coupled together by a rear cross bar 58. The front links 52 have lower ends 53 pivotally coupled to mounting bosses 60 in the base and upper ends 55 pivotally coupled to mounting bosses 62 in a bracket 64. The bracket 64 is attached to the lower panel 96 of the of the platform mounting member 42. Likewise, the rear links 54 have lower ends 53 pivotally coupled to mounting bosses 66 in the base and upper ends 55 pivotally coupled to mounting bosses 68 in the bracket 64.

Figure 6:
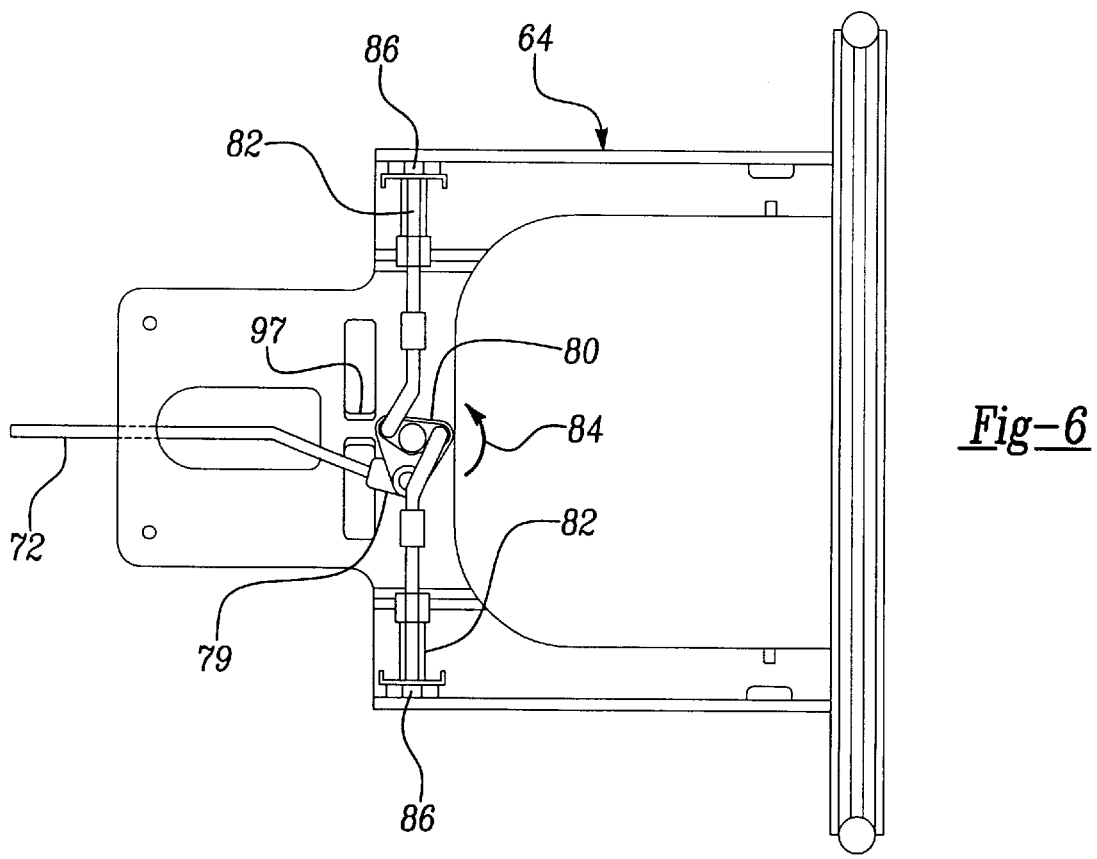
FIG. 6 is plan view of the latch mechanism of the activity center shown in FIGS. 2–5.

The bracket 64 also carries a latching mechanism 70 which holds the platform mounting member in both the open and closed positions. The latch mechanism 70 includes a push rod 72 which has an end 74 coupled to a push button 76. The push button 76 is disposed in a recess 78 along the front edge 80 of panel 96. The push rod 72 is pushed rearward to release the latch mechanism. The push rod 72 has a second end 79 coupled to a bell crank 80. The bell crank is in turn coupled to a pair of latch pins 82 which move laterally inward when the bell crank 80 is rotated counterclockwise as viewed in FIG. 6 as shown by the arrow 84. This releases the latch enabling the platform mounting member to move. The distal ends 86 of the latch pins 82 are seated in a notch 88 in the front links 52 when the platform mounting member 42 is in the closed position. When the platform mounting member is in the open position, the distal ends 86 of the latch pins 82 are seated into notches 90 at the upper ends of the links 52. Thus, the latch mechanism 70 operates to hold the platform mounting member in both the open and closed positions. The latch mechanism is released by pushing of the push button 76 to release the latch when the platform mounting member is in both the open and closed positions. A compression spring 92 located between the button 76 and lower panel 96 in the recess 78 provides a biasing force to urge the latch mechanism to its latched position.

A gas cylinder 94 assists lifting of the platform mounting member 42. The gas cylinder has one end coupled to the fitting 95 on the rear cross member 58 connecting the two rear links 54. The other end of the gas cylinder is coupled to a fitting 97 on the lower side of the bracket 64 of the platform mounting member 42. Other bias means can be used to assist in lifting the platform mounting member such as a spring, counterweights, electric motors or pneumatic or hydraulic devices.

Figure 5:
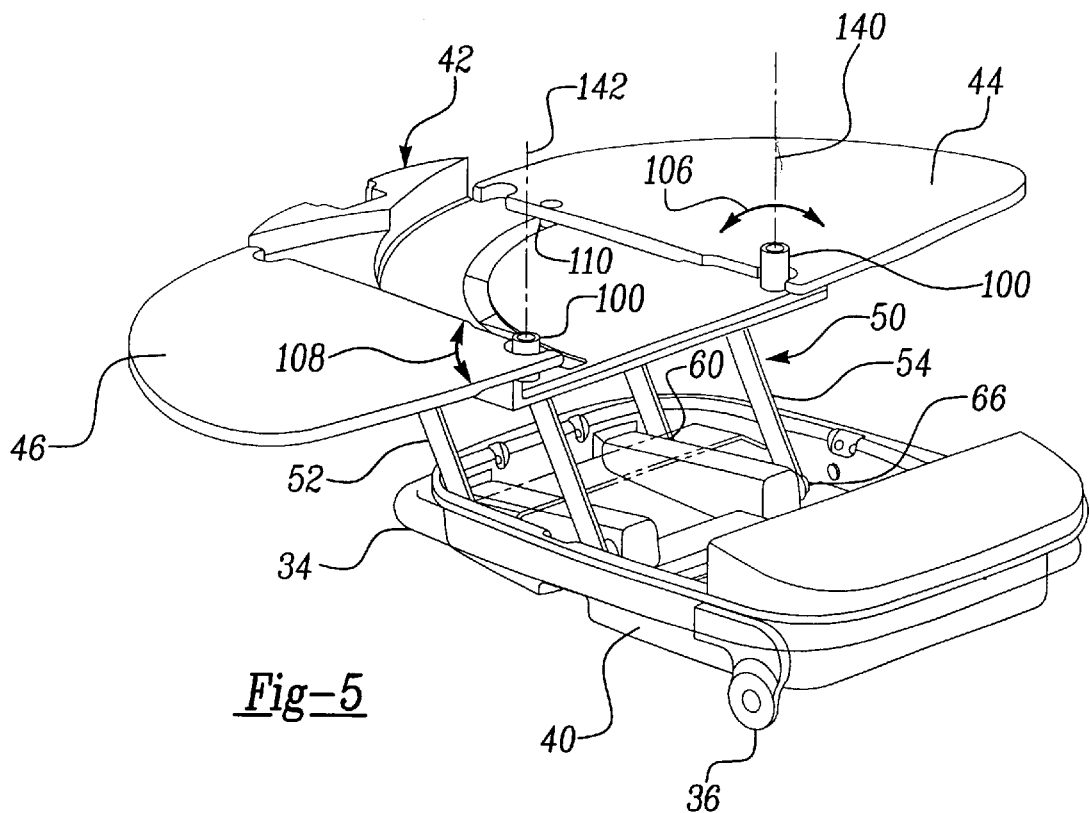
FIG. 5 is a perspective view of the activity center with a portion removed for clarity.

In the embodiment shown in FIGS. 2–5, the platform mounting member 42 has a lower panel 96 and an upper panel 98. The upper and lower panels 96 and 98 are spaced from one another with the platforms 44 and 46 disposed therebetween. Each of the platforms 44, 46 includes a pivot mounting boss 100, only one of which is shown in FIG. 5 in conjunction with platform 46. The platform 44 is pivotally mounted to the platform mounting member at the right rear corner 102 of the platform mounting member 42. Likewise, the platform 46 is pivotally mounted to the platform mounting member at a left rear corner 104 of the platform mounting member 42. The platform 44 rotates between a stowed position between the upper and lower panels of the platform mounting member 42 and a use position extending laterally from the platform mounting member. The motion of the platform 44 is shown by the arrow 106 in FIG. 5. Likewise, motion of the platform 46 is shown by the arrow 108. The right platform 44 has a downward projecting pin 110 which travels within an arcuate groove 112 in the lower panel 96 of the platform mounting member 42. The left platform 46 has an upwardly projecting pin 114 which travels in an arcuate groove (not shown) in the lower surface of the upper panel 98 of the platform mounting member 42. The left panel 46 is positioned above the right panel 44 in the stowed position. The lower panel 96 has a raised support surface 97 to support the left platform 46 above the right platform 44.

Each of the platforms 44 and 46 have top surfaces 116 and 118 respectively which, when the platforms are in the use positions, form a top surface for work or play. In their use positions, the platforms 44 and 46 are spaced above the surface 16 of the seat bottom 12 and spaced forward of the surface 18 of the seat back 14. In their use positions, the platforms partially extend over the width of the seating positions 20 and 24 respectively and are thus over the lap of an occupant seated at the seating positions. The top surfaces 116 and 118 of the platforms are generally planer but can have various raised ridges and recesses. For example, a recessed groove 120 can be provided for holding a pencil. A raised ridge 122 about the periphery of the platform surface can keep objects from rolling off the platform. Various materials can be used for the top surface of the platforms. One possible material is a smooth plastic material from which a dry erase marker can be readily erased.

Figure 7:
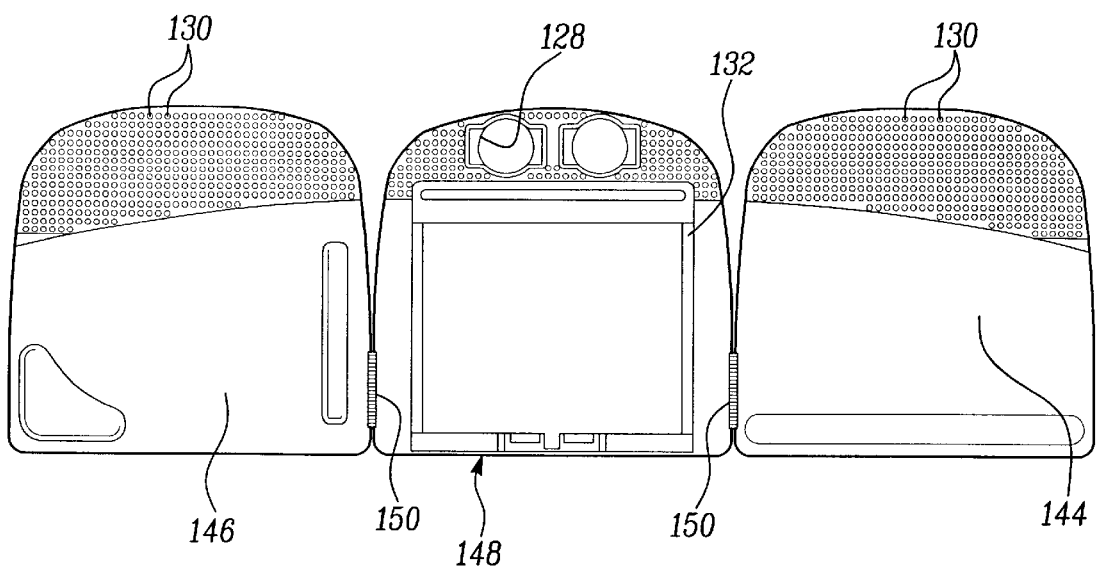
FIG. 7 is a plan view of an alternative embodiment of the activity center shown with the platforms deployed and coupled to the mounting member by hinges.

Other toys can be integrated into the activity center and form the top surface of the platforms or the top surface of the platform mounting member upper panel 98. For example, with reference to FIG. 4, the top surface 126 of panel 98 is shown with raised studs 130 for engagement with interlocking building blocks such as Lego® blocks. Raised studs 130 can also form portions of the top surface of the platforms as shown in FIG. 7.

Other toys can be integrated into the activity center either in the platforms 44 and 46 or the upper panel 98. For example, a magnetic drawing toy 132 such as the Magna Doodle® from Tyco Toys or an Etch-a-Sketch® from the Ohio Art Company, can be included as shown in reference to FIG. 7 These toys from a part of the activity center structure and the top surfaces of various components of the activity center. While flat panel toys such as the Etch-a-Sketch® or Lego® block stud panels may be preferred for integration into the activity center, other toys may also be integrated.

The upper panel 98, platforms 44, 46 or other parts of the activity center may also include one or more recesses or apertures 128 forming cup holders. A standard vehicle power port can be included in the activity center to facilitate use of computers or electronic games.

The platforms 44 and 46 rotate outward from the platform mounting member 42 by rotation about vertical axes 140 and 142 (FIG. 5). The motion of the platforms can be referred to generally as a fanning motion in that the platforms fan out from the platform mounting member. The rotation axes of the platforms are generally perpendicular to the platform surfaces. In other embodiments, such as that shown in FIG. 7, the platforms 144 and 146 are hinged to the platform mounting member 148. The hinges 150 between each of the platforms 144 and 146 and the platform mounting member 148 enable rotation of the platforms about generally horizontal axes extending longitudinally of the vehicle.

Other mechanisms besides the 4-bar linkage mechanism 50 can be used to move the platform mounting member between the open and closed positions. Depending upon the thickness of the seat back center panel 28, it may not be necessary for the platform mounting member to move upward. In such a case, the platform mounting member may move forward from the base on a track mechanism between the open and closed positions.

Figure 8:
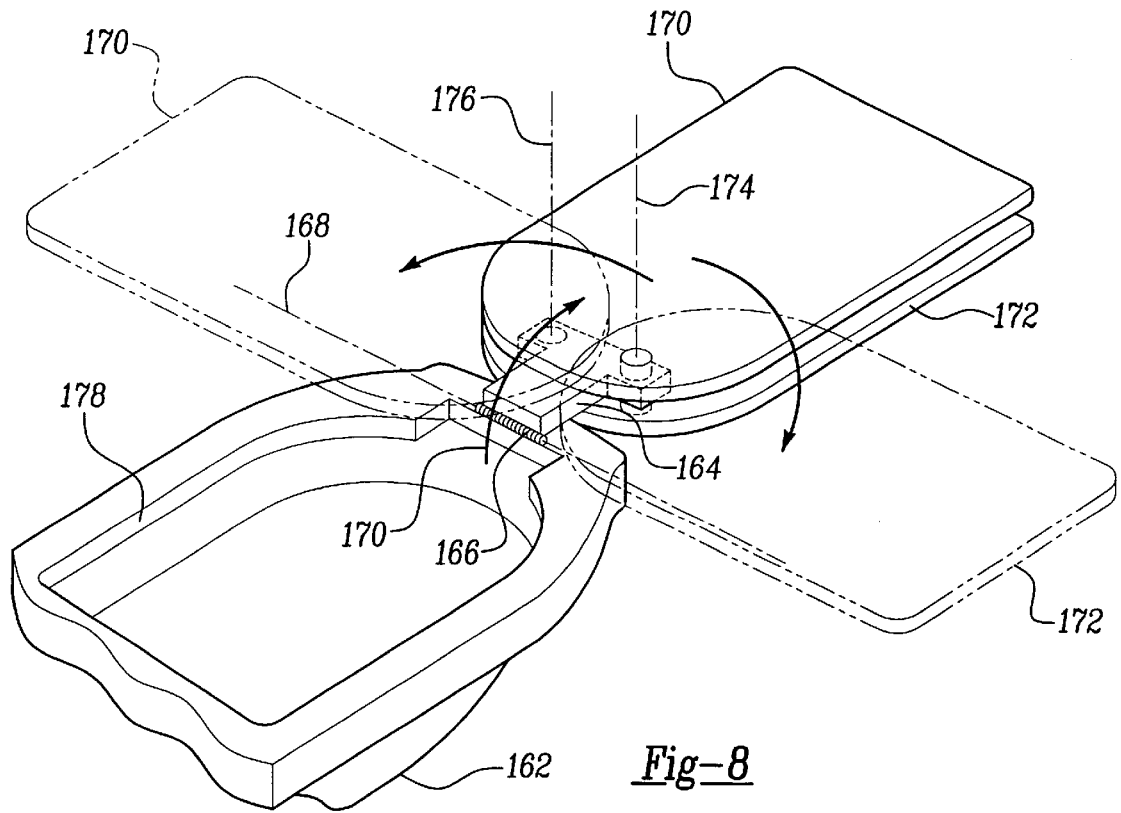
FIG. 8 is a perspective view of another embodiment of the activity center shown in a deployed position.
Figure 9:
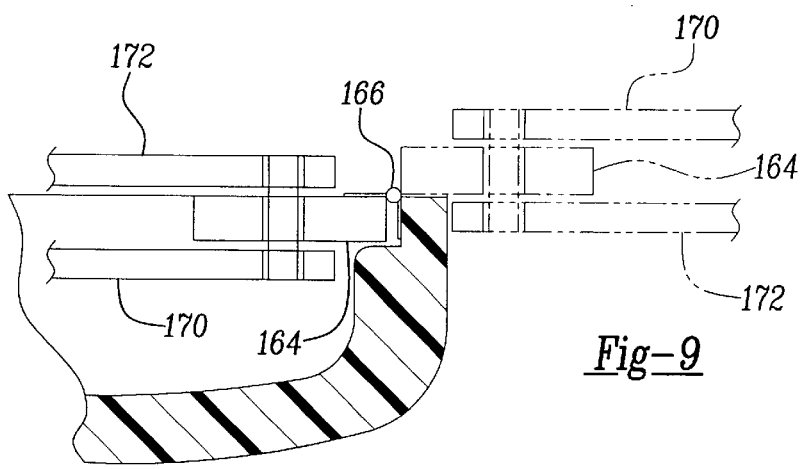
FIG. 9 is a partial sectional view of the activity center shown in FIG. 8.

An alternative embodiment of the activity center is shown in FIGS. 8–9. The activity center includes a base 162 similar to the base 40. The base 162 is fixed to the frame of the seat back center panel 28. A platform mounting member 164 is coupled to the base by a hinge 166 for rotation about a transverse axis 168 near the forward end of the base 162. The platform mounting member rotates approximately 180° as shown by the arrow 170. A pair of platforms 170 and 172 are mounted to the platform mounting member for rotation about the generally vertical axes 174 and 176. In this embodiment, it is not the platform mounting member that opens and closes the base 162 but rather the platforms 170 and 172 which fit in and close the opening 178 of the base 162.

The activity center is not limited to a device having two platforms extending in opposite directions over two spaced seating positions. The activity center could have only one platform to extend in only one direction from the platform mounting member over a single seating position. For example, the activity center could be mounted to a center console and have a platform that extends over only the passenger side seating position. The activity center could be mounted to a vehicle body side wall and have a platform that extends over only a single seating position located adjacent to the side wall. The activity center is not limited to a fold down panel in a seat back leading to a trunk pass-thru. The activity center could be mounted to a center panel such as an armrest that, when rotated down does not open a pass-thru but is disposed within a recess in the seat back. The activity center could also pivot out of the seat cushion with soft top and with pivoting table surfaces.

Figure 10:
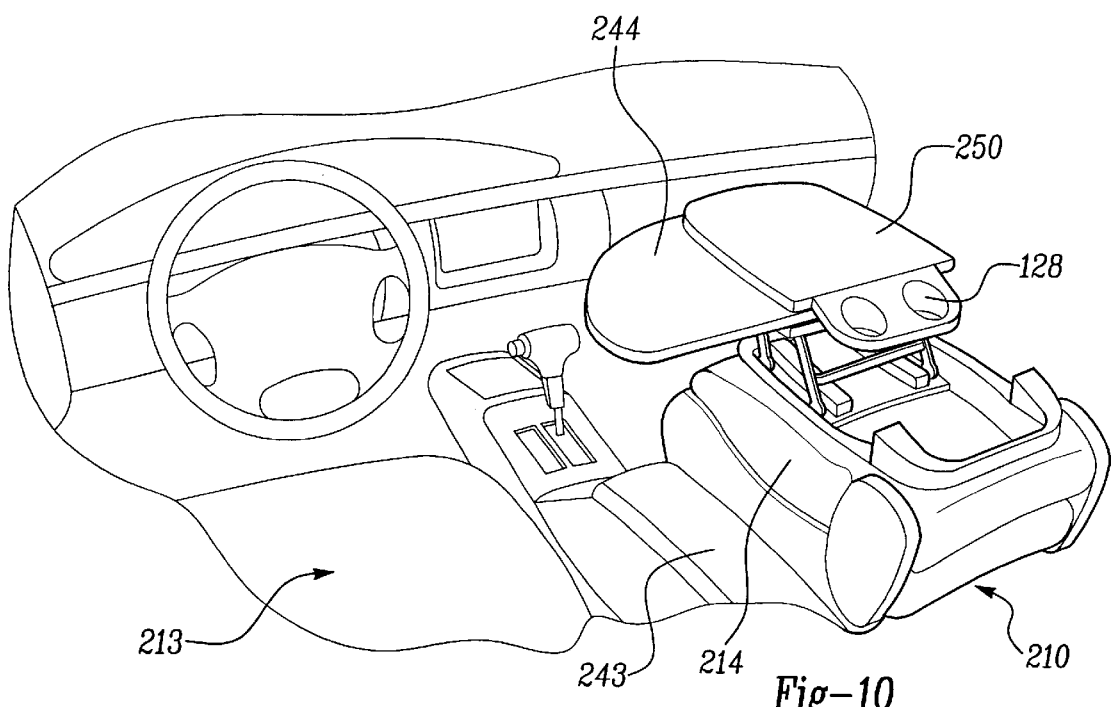
FIG. 10 is a perspective view of still another embodiment of the activity center mounted to the rear side of the seat back of a vehicle front passenger seat with the seat back folded or pivoted forward revealing the activity center on the rear side of the seat back.

In another embodiment, shown in FIG. 10, the activity center can be located in the seat back 214 of a vehicle front passenger or captain's seat 210 to provide a work platform for the person seated in the driver's seat 213 or other adjacent captain's seat. In this situation, only a single platform 244 is provided to extend laterally toward the adjacent seat. Furthermore, while the platform extends laterally from the platform mounting member 250 of the activity center, it may only extend over a center console 243 and does not extend over a portion of the width of the seating position occupied by the driver of the vehicle.

Figure 11:
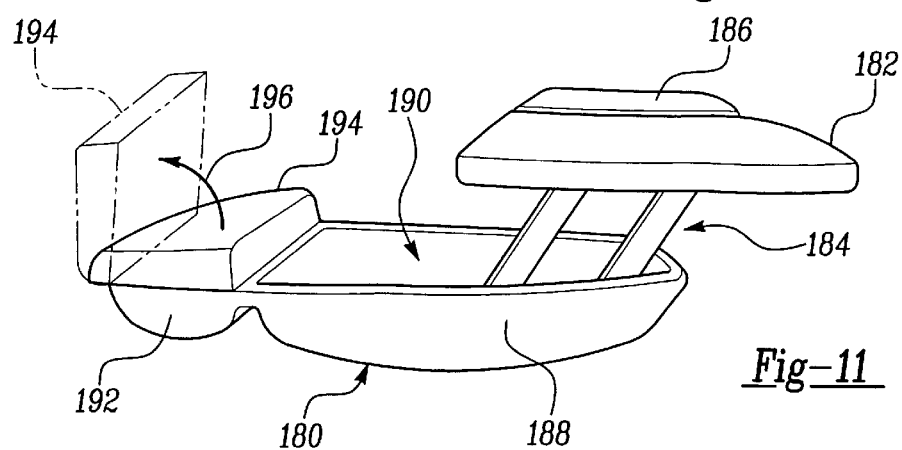
FIG. 11 is a perspective view of a further embodiment of the activity center with two storage compartments in the activity center base.

With reference to FIG. 11, yet another embodiment of the activity center is shown. Here the activity center includes a base 180. The base 180 is fixed to the frame of the seat back center panel as described above. A platform mounting member 182 is coupled to the base 180 by a linkage mechanism 184. A platform 186 is in turn rotatably mounted to the platform mounting member 182. In this embodiment, the base has a front portion 188 forming a first compartment 190 which is opened and closed by the platform mounting member 182. A rear portion 192 forms a second compartment that is covered by a lid 194. The lid 194 is rotatably mounted to the base and can be raised as shown by the arrow 196 to open the rear compartment. The lid 194 could be mounted to slide relative to the base rather than rotate by a hinge.

It is to be understood that the invention is not limited to the exact construction illustrated and described above, but that various changes and modifications may be made without departing from the spirit and scope of the invention as defined in the following claims.

What is claimed is:

1. An activity center for a vehicle having a first seating position defined by a generally horizontal seat bottom and a seat back extending upwardly at a rear end of the seat bottom, the first seating position having a width, said activity center comprising:
   a base mounted within the vehicle;
   a platform mounting member adapted to be mounted to the base laterally displaced from and proximate to the first seating position, said platform mounting member mounted for movement between a platform mounting member stowed position and a platform mounting member use position;
   a bias device operable to urge said platform mounting member to said platform mounting member use position; and
   a first platform having a first surface mounted to said platform mounting member for movement relative to said platform mounting member between a first platform stowed position and a first platform use position, said first platform, when in said first platform use position, being spaced above the seat bottom and spaced forward of the seat back and extending from said platform mounting member at least partially over the width of the first seating position with said first surface facing upward to form a first top surface.

2. The activity center as defined in claim 1 wherein the vehicle has a second seating position laterally adjacent to said platform mounting member on an opposite side of the platform mounting member from the first seating position and said activity center further comprising a second platform having a second surface mounted to said platform mounting member for movement relative to said platform mounting member between a second platform stowed position and a second platform use position, said second platform, when in said second platform use position being spaced above the seat bottom and spaced forward of the seat back and extending from said platform mounting member at least partially over the width of the second seating position with said second surface facing upward to form a second top surface.

3. The activity center as defined in claim 1 wherein said first platform moves from said first platform stowed position to said first platform use position by rotation about an axis generally perpendicular to said first surface.

4. The activity center as defined in claim 1 wherein said first platform is operably coupled to the seat back.

5. The activity center as defined in claim 1 wherein the said platform mounting member is movable between a stowed position and a use position laterally proximate the seating position.

6. The activity center as defined in claim 1 wherein the platform mounting member is operably coupled to the vehicle seat back proximate to the seating position.

7. The activity center as defined in claim 1 wherein said the platform mounting member is spaced vertically from said base when in said platform mounting member use position.

8. The activity center as defined in claim 1 wherein said first platform is movably mounted to said platform mounting member for movement to said first platform use position when said platform mounting member is in said platform mounting member use position.

9. The activity center as defined in claim 1 further comprising a drawing toy with a flat panel surface forming a portion of said top surface of said platform or a top surface of said platform mounting member.

10. An activity center for a vehicle having a seating position defined by a generally horizontal seat bottom and a seat back extending upwardly at a rear end of the seat bottom, the seating position having a width, said activity center comprising:
  a base mounted within the vehicle;
  a platform mounting member adapted to be mounted to the base laterally displaced from and proximate to the seating position, said platform mounting member mounted for movement between a platform mounting member stowed position and a platform mounting member use position;
  a latch releasably holding said platform mounting member in said platform mounting member use position; and
  a platform having a first surface mounted to said platform mounting member for movement relative to said platform mounting member between a platform stowed position and a platform use position, said platform, when in said platform use position, being spaced above the seat bottom and spaced forward of the seat back and extending from said platform mounting member at least partially over the width of the seating position with said first surface facing upward to form a top surface.

11. The activity center as defined in claim 10 wherein said latch is operable for releasably holding said platform mounting member in said platform mounting member stowed position.

12. The activity center as defined in claim 11 wherein said latch has a single depressible button to release said latch for movement of said platform mounting member from both said platform mounting member use position and said platform mounting member stowed position.

13. An activity center for a vehicle having a seating position defined by a generally horizontal seat bottom and a seat back extending upwardly at a rear end of the seat bottom, the seating position having a width, said activity center comprising:
  a base mounted to the seat back proximate to the seating position;
  a platform mounting member adapted to be mounted to the base laterally displaced from and proximate to the seating position, said platform mounting member mounted for movement between a platform mounting member stowed position and a platform mounting member use position;
  a platform having a first surface mounted to said platform mounting member for movement relative to said platform mounting member between a platform stowed position and a platform use position, said platform, when in said platform use position, being spaced above the seat bottom and spaced forward of the seat back and extending from said platform mounting member at least partially over the width of the seating position with said first surface facing upward to form a top surface; and
  wherein said base forms a storage compartment which is closed by said platform mounting member when said platform mounting member is in said platform mounting member stowed position and which is accessible when said platform mounting member is in said platform mounting member use position.

14. The activity center as defined in claim 1 further comprising a holder for a beverage container.

15. An activity center for a vehicle having a seating position defined by a generally horizontal seat bottom and a seat back extending upwardly at a rear end of the seat bottom, the seating position having a width, said activity center comprising:
  a platform mounting member adapted to be mounted within the vehicle laterally displaced from and proximate to the seating position;
  a platform having a first surface mounted to said platform mounting member for movement relative to said platform mounting member between a platform stowed position and a platform use position, said platform, when in said platform use position, being spaced above the seat bottom and spaced forward of the seat back and extending from said platform mounting member at least partially over the width of the seating position with said first surface facing upward to form a top surface; and
  a panel having a plurality of raised studs for engagement with building blocks, wherein said panel is positioned on at least a portion of one of said platform mounting member and said platform.

16. A vehicle seat assembly comprising:
  a generally horizontal seat bottom;
  a seat back extending upwardly at a rear end of the seat bottom, said seat bottom and said seat back defining a first seating position
  a first platform having a first surface, said first platform being mounted to said seat back laterally displaced from and proximate said first seating position for movement between a first platform stowed position and a first platform use position, said first platform when in said first platform use position being spaced above the seat bottom and spaced forward of the seat back and extending at least partially over the width of said first seating position with said first surface facing upward to form a first top surface; and
  a panel having a plurality of raised studs for engagement with building blocks, said panel forming at least a portion of said first surface.

17. The vehicle seat assembly as defined in claim 16 further comprising a second platform having a second surface mounted to said seat back for movement between a second platform stowed position and a second platform use position, said second platform when in said second platform use position being spaced above said seat bottom and spaced forward of said seat back and extending at least partially over the width of the second seating position with said second surface facing upward to form a second top surface.

18. The vehicle seat assembly as defined in claim 16 wherein said first platform moves from said first platform stowed position to said first platform use position by rotation about an axis generally perpendicular to said first surface.

19. The vehicle seat assembly as defined in claim 16 further comprising a platform mounting member to which said first platform is attached, said platform mounting member having a generally planer top surface.

20. The vehicle seat assembly as defined in claim 19 further comprising a toy fixed to one of said first platform and said platform mounting member.

21. The vehicle seat assembly as defined in claim 20 wherein said toy is a drawing toy with a flat panel surface forming a portion of said first top surface of said first platform or said platform mounting member.

22. The vehicle seat assembly as defined in claim 16 further comprising a holder for a beverage container.

23. The vehicle seat assembly as defined in claim 16 further comprising a base attached to said seat back portion extending laterally of said seating position and a platform mounting member coupled to said base and said first platform being movably mounted to said platform mounting member.

24. The vehicle seat assembly as defined in claim 23 wherein said platform mounting member is movably mounted to said base for movement between a platform mounting member stowed position and a platform mounting member use position.

25. The vehicle seat assembly as defined in claim 24 further comprising a latch for releasably holding said platform mounting member in said platform mounting member use position.

26. The vehicle seat assembly as defined in claim 16 wherein a portion of said seat back is rotatable relative to said seat bottom.

27. A vehicle seat assembly comprising:
  a generally horizontal seat bottom;
  a seat back extending upwardly at a rear end of the seat bottom, said seat bottom and said seat back defining a seating position;
  a base attached to said seat back portion extending laterally of said seating position and a platform mounting member coupled to said base;
  a platform having a first surface, said platform being movably mounted to said platform mounting member for movement between a platform stowed position and a platform use position, said platform when in said platform use position being spaced above the seat bottom and spaced forward of the seat back and extending at least partially over the width of said seating position with said first surface facing upward to form a top-surface; and
  a bias mechanism operable to urge said platform mounting member to a platform mounting member use position.

28. The vehicle seat assembly as defined in claim 27 further comprising a latch for releasably holding said platform mounting member in said platform mounting member use position and in a platform mounting member stowed position.

29. A vehicle seat assembly comprising:
  a generally horizontal seat bottom;
  a seat back extending upwardly at a rear end of the seat bottom, said seat bottom and said seat back defining a seating position;
  a base attached to said seat back portion extending laterally of said seating position and a platform mounting member coupled to said base, said platform mounting member movably mounted to said base by a 4-bar linkage;
  a platform having a first surface, said platform being movably mounted to said platform mounting member for movement between a platform stowed position and a platform use position, said platform when in said platform use position being spaced above the seat bottom and spaced forward of the seat back and extending at least partially over the width of said seating position with said first surface facing upward to form a top surface.

30. A vehicle seat assembly comprising:
  a generally horizontal seat bottom;
  a seat back extending upwardly at a rear end of the seat bottom, said seat bottom and said seat back defining a seating position;
  a base attached to said seat back portion extending laterally of said seating position and a platform mounting member coupled to said base;
  a platform having a first surface, said platform being mounted to said seat back laterally displaced from and proximate said seating position for movement between a platform stowed position and a platform use position, said platform when in said platform use position being spaced above the seat bottom and spaced forward of the seat back and extending at least partially over the width of said seating position with said first surface facing upward to form a top surface, wherein said base includes a storage compartment proximate said platform.

31. An activity center for a vehicle having a seating position defined by a generally horizontal seat bottom and a seat back extending upwardly at a rear end of the seat bottom, the seating position having a width, said activity center comprising:
  a base adapted to be mounted with the vehicle;
  a platform mounting member coupled to said base and movable relative to said base between a platform mounting member stowed position and a platform mounting member use position;
  a platform mounted to said platform mounting member for movement relative to said platform mounting member, when said platform mounting member is in said platform mounting member use position, between a platform stowed position and a platform use position, said platform, when in said platform use position, being spaced above the seat bottom and spaced forward of the seat back and extending at least partially over the width of the seating position; and
  a bias device operable to urge said platform mounting member to said platform mounting member use position.

32. The activity center as defined in claim 31 wherein said platform mounting member is coupled to said base, for movement relative to said base, by a linkage.

33. The activity center as defined in claim 31 wherein said platform is coupled to said platform mounting member, for rotational movement relative to said platform mounting member about a generally vertical axis.

34. An activity center for a vehicle having a seating position defined by a generally horizontal seat bottom and a seat back extending upwardly at a rear end of the seat bottom, the seating position having a width, said activity center comprising:

a base adapted to be mounted within the vehicle;

a platform mounting member coupled to said base and movable relative to said base between a platform mounting member stowed position and a platform mounting member use position; and a panel having a plurality of raised studs for engagement with building blocks, wherein said panel is positioned on at least a portion of said platform mounting member.

* * * * *